May 7, 1968
L. W. TOPHAM
3,382,312
SIMULATOR FOR AIR SPEED METER WITH ELECTRONICALLY CONTROLLED SERVO VALVE
Filed Aug. 29, 1963
3 Sheets-Sheet 1
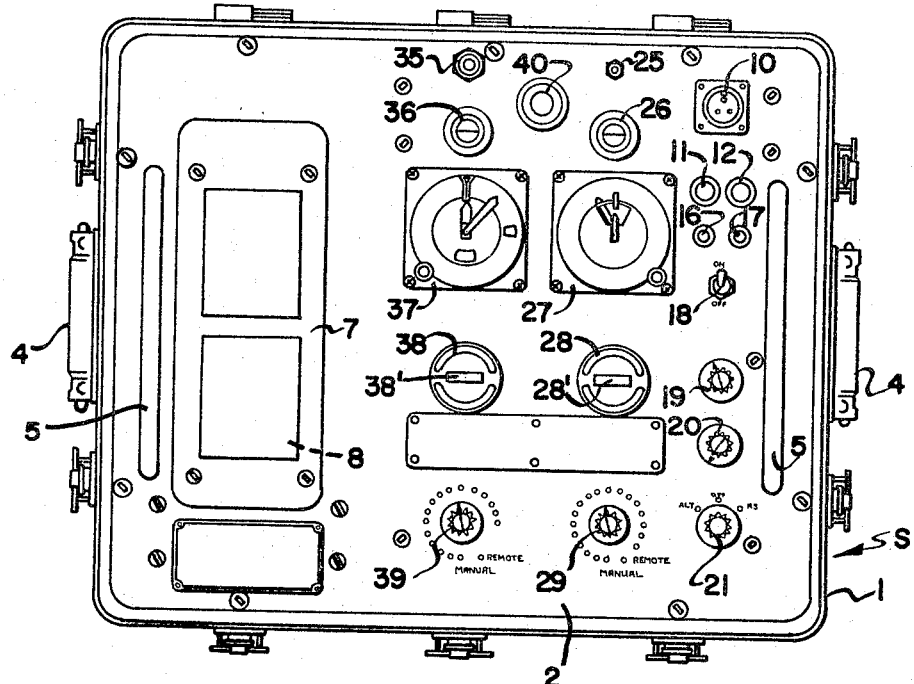
FIG_1
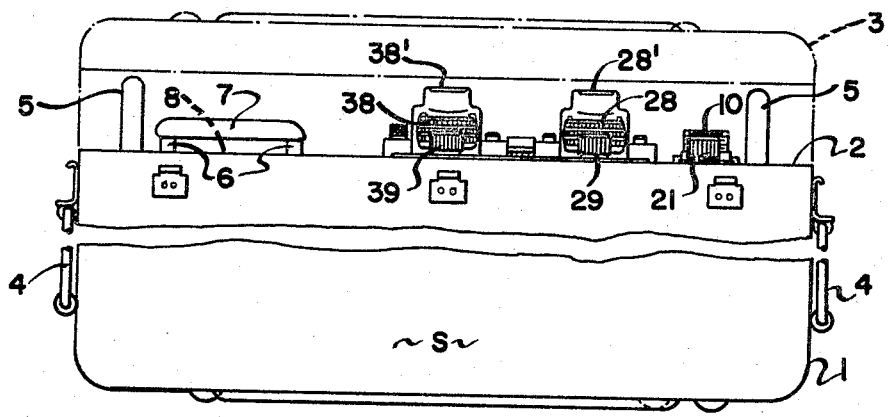
FIG_2
INVENTOR.
LELAND W. TOPHAM
BY
Oberlin, Maky & Donnelly
ATTORNEYS

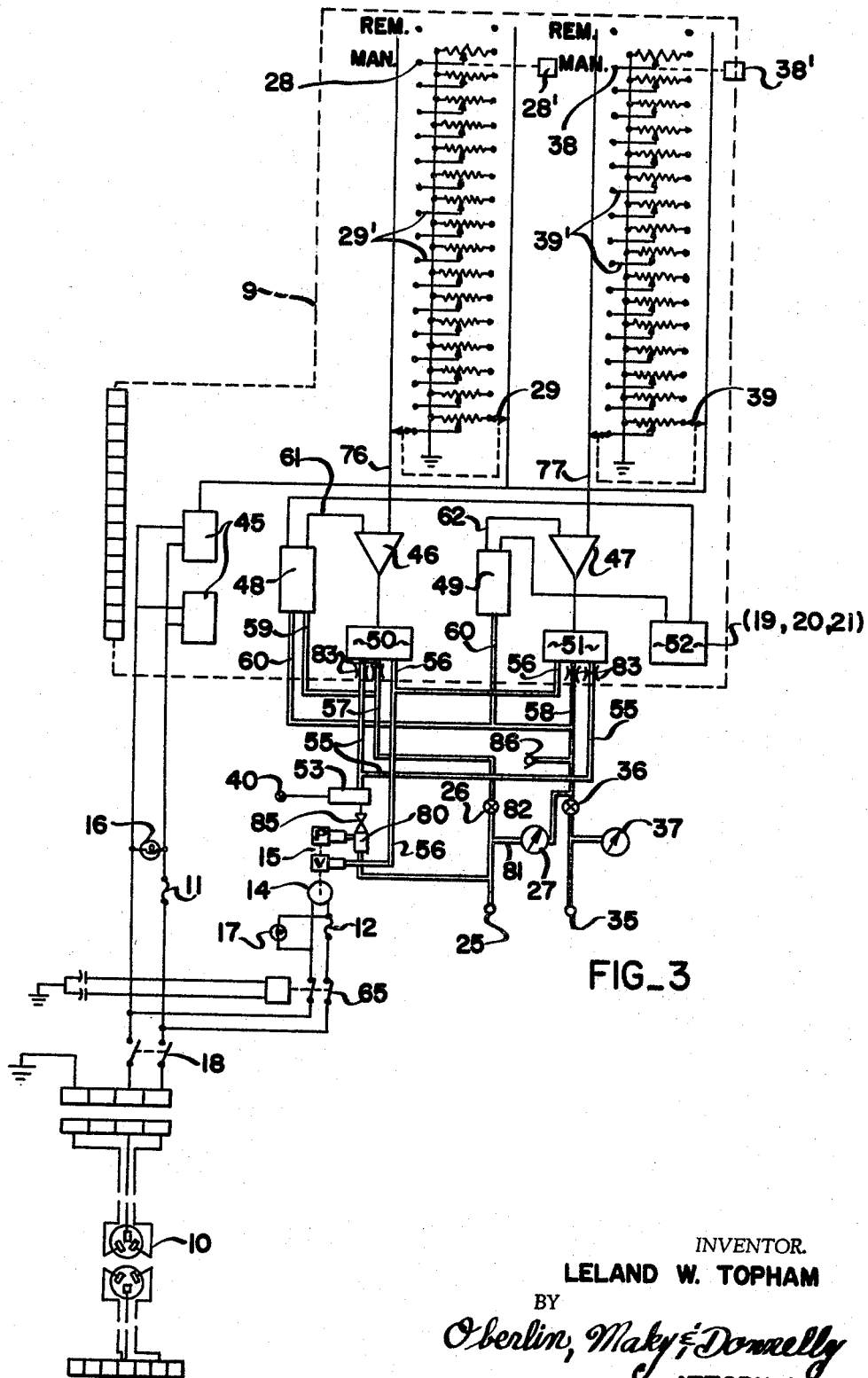
FIG_3

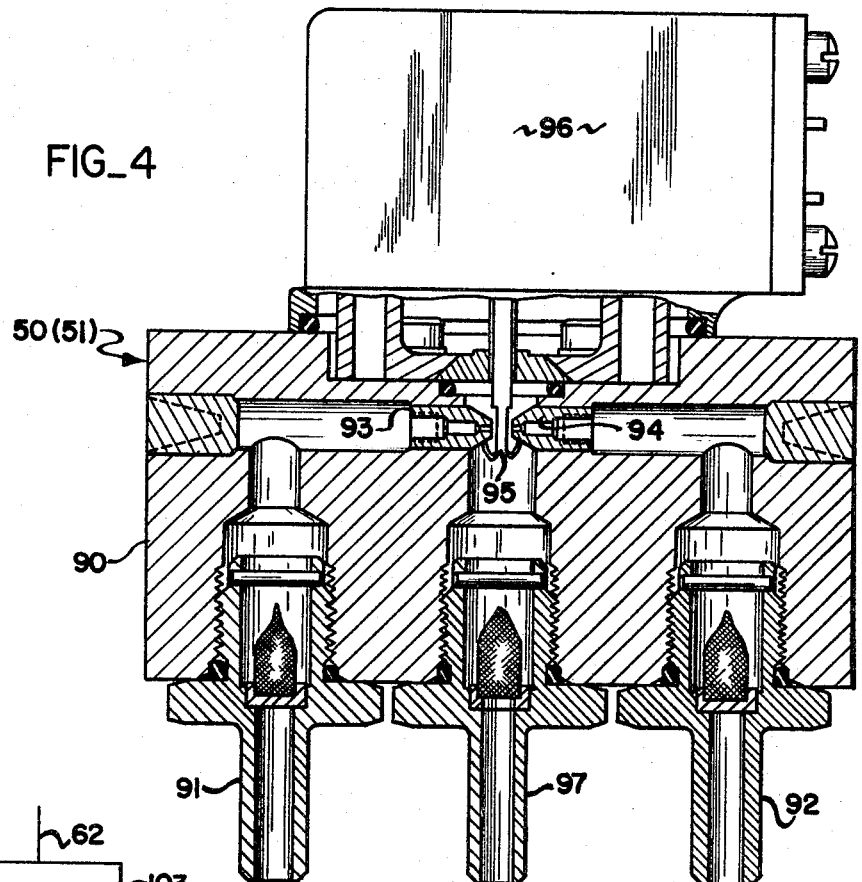
FIG_4
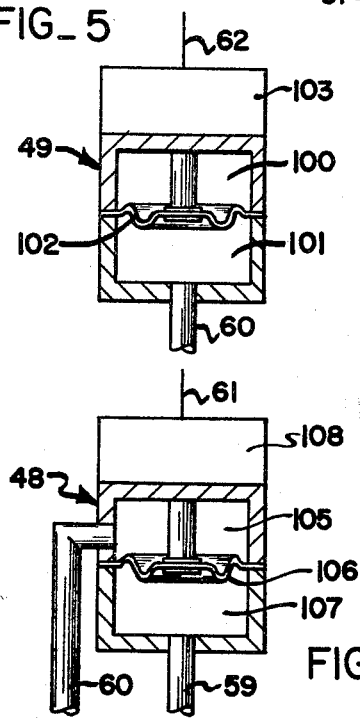
FIG_5
FIG_6
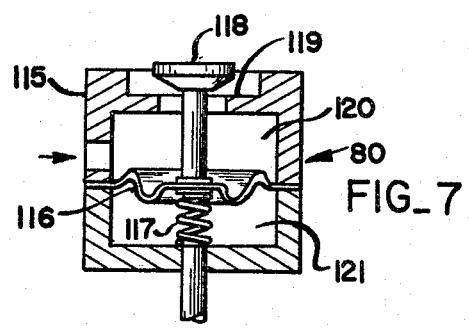
FIG_7
INVENTOR.
LELAND W. TOPHAM
BY
Oberlin, Maky & Donnelly
ATTORNEYS

United States Patent Office 3,382,312
Patented May 7, 1968

3,382,312
SIMULATOR FOR AIR SPEED METER WITH ELECTRONICALLY CONTROLLED SERVO VALVE
Leland W. Topham, Sherman Oaks, Calif., assignor to Parker-Hannifin Corporation, Cleveland, Ohio, a corporation of Ohio
Filed Aug. 29, 1963, Ser. No. 305,311
23 Claims. (Cl. 35—10.2)

ABSTRACT OF THE DISCLOSURE

A simulator having an electronically controlled servo valve which provides accurately controlled pressures at an outlet connection for checking air speed meters, altimeters, and like instruments connected thereto.

Disclosure

The present invention relates generally as indicated to a simulator and more particularly to a simulator that provides an accurate source of pressure useful for simulating flight conditions of altitude, air speed, Mach number, and shock wave conditions for the ground checkout of automatic flight controls, navigation, armament, and standby instruments.

It is a principal object of this invention to provide a simulator or more specifically an altitude-air speed calibrator which is in the form of a lightweight portable package capable of simulating actual flight conditions by generating and controlling static and Pitot pressure outputs within very close limits, such as 0.005 in. Hg.

It is another object of this invention to provide a simulator of the character indicated in which the inputs may be set either manually from the control panel of the simulator, or from a remote checkout system, the remote inputs lending themselves for feeding thereto of programmed information from punched cards, magnetic tape or the like, to thereby simulate conditions of an entire flight.

It is another object of this invention to provide a simulator of the character indicated in which the aforesaid manual inputs provide digital type presentation of control settings for ready comparison of the simulator instruments with the aircraft instruments.

It is another object of this invention to provide a simulator of the character indicated which has associated therewith a temperature controlled enclosure around the sensitive electronic components thereof and which also has associated therewith a time delay circuit for energizing the air compressor-vacuum pump unit a predetermined time period after the electronic components have been energized whereby transients are stabilized.

It is another object of this invention to provide a simulator having safety devices to prevent instrument or system damage from excessive pressures and to eliminate sudden changes in pressure due to connection and disconnection of the outputs with the aircraft instruments.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIGS. 1 and 2 are top plan and front elevation views of a simulator in accordance with the present invention;

FIG. 3 is a schematic wiring and piping diagram of the simulator constituting the present invention;

FIG. 4 is a fragmentary cross-section view of one of the electropneumatic servo valves employed in the simulator herein;

FIGS. 5 and 6 are schematic cross-section views of the electro-mechanical transducers employed in the present simulator; and FIG. 7 is a schematic cross-section of a differential regulator associated with the air pump.

Referring now more particularly to the drawing, and first to FIGS. 1 and 2, the simulator S there shown comprises a base 1 having a control panel 2 and a hinged cover 3. The cover 3 is preferably arranged so that when unlatched and swung to open position, it may be completely removed from the base 1 whereupon the base 1 may be lifted either by the handles 4 on the sides thereof, or by the handles 5 extending upwardly from the face of the control panel 2.

Mounted on the control panel 2, as on the posts 6, in spaced relation above the panel, is a cover plate 7 which suitably may be provided with calibration data for altitude and air speed. Beneath the cover plate 7 is a filter exhaust fan 8 which circulates air to prevent thermal stratification within the thermostatically controlled thermal oven 9 in which the electronic components are enclosed within the base 1 of the simulator S.

The control panel 2 has thereon:

A connector 10 to which a suitable electric power source is adapted to be connected, for example, in 115 v. A.C. single phase, 400 or 60 cycles;

Fuses 11 and 12 for the electric power circuit and for the drive motor 14 for the air compressor-vacuum pump unit 15 (see FIG. 3);

Indicator lights 16 and 17 for the controller and pump unit respectively;

A main power switch 18;

A modulation amplitude control 19;

A frequency control 20; and

An altimeter-air speed incidator selector switch 21.

In the next row on the control panel 2 are the following:

Pitot pressure output connector 25 in the form of a quick disconnect self-sealing coupling element;

A normally open Pitot pressure shutoff valve 26;

An air speed indicator 27;

A continuously variable Pitot pressure control 28 with digital readout 28';

A stepping control 29, preset by potentiometers 29' for selecting Pitot pressures in uniform steps corresponding to air speeds from 80 knots to 850 knots, for example.

In the next row on the control panel 2 are the following:

Static pressure output connector 35 in the form of a quick disconnect self-sealing coupling element;

A normally open static pressure shutoff valve 36;

An altimeter 37;

A continuously variable static pressure control 38 with digital readout 38'; and A stepping control 39, preset by potentiometers 39', for selecting static pressures corresponding to altitudes from −1000′ to 80,000′, for example.

Finally, the control panel 2 has thereon a filter drain valve 40 which is normally closed and which, when opened, drains the liquid from the filter unit 53.

Referring now to the schematic diagram of FIG. 3, the connector 10 is coupled by suitable means with an electric power source and when the power switch 18 is closed, a circuit is established through the rectifiers 45 which are selected to provide an accurate output voltage to the air speed and and altitude program selectors within .05%. Desired command signals to D.C. amplifiers 46 and 47 are provided in any of several ways, to wit, (a) By manipulating the selectors 29 and 39 to selected steps which have been accurately preset by the potentiometers 29' and 39';

(b) By setting the selectors 29 and 39 to "MANUAL" position, and then turning the continuously variable controls 28 and 38 to get accurate settings as indicated by the digital readout 28' and 38'; and (c) By setting the selectors 29 and 30 to "REMOTE" position and then connecting thereto a remote source of command signals which may be programmed by punched cards, tape, or the like. It is to be understood that desired D.C. voltages are supplied from the rectifiers 45 to the D.C. amplifiers 46 and 47, transducers 48 and 49, servo valves 50 and 51, and modulation circuit 52.

Connected in parallel with the A.C. supply line is the drive motor 14 for the air compressor-vacuum pump unit 15, the compressor portion being designated by the letter P and the vacuum pump portion being designated by the letter V. The unit PV is preferably of the oilless, dry type to avoid presence of oil and water vapors in the system with vapors being removed by a suitable absorbent filter 53 and liquid collected thereby may be drained when necessary by opening the drain or bleed valve 40. The pressure line 55 from the compressor P is connected to the respective servo valves 50 and 51 as is the vacuum line 56 of the vacuum pump V. The servo valves 50 and 51 are of known construction to provide via the lines 57 and 58 either a positive or negative pressure source at the Pitot and static pressure connectors 25 and 35. These pressure outputs through lines 59 and 60 are connected with the respective electro-mechanical transducers 48 and 49 which transform pressure energy to electrical energy, the latter being part of feedback loops 61 and 62 to the feedback amplifiers which are arranged to compare the respective command input signals with the feedback signals to provide inputs to the respective amplifiers 46 and 47 consisting of signals which are the differences of the respective command input signals and the feedback or "error" signals, the respective error signals being converted to the desired output signals, whereby the output pressures from the servo valves 50 and 51 will be those which correspond to the command signals, either from remote sources or from the manual settings. When the respective command signals and sensor signals are equal a null condition exists to the respective servo valves 50 and 51.

It is to be noted that in the aforesaid motor 14 circuit there is installed a time-delay relay 65 which will close the motor circuit a predetermined time, for example, one minute, after the power switch 18 has been closed whereby the aforesaid electronic components will have reached their stabilized operating conditions insofar as transients are concerned.

The altimeter and air speed indicator modulation circuit 52 with its amplitude and frequency controls 19 and 20, is operatively connected with either the transducer 48 or 49 by the selector 21 to provide frequencies adjustable from .1 to 3.0 c.p.s. and to provide amplitudes corresponding to .01 to .14 in. Hg, which modulation is desirable for system stability checkout. This sinusoidal output may be employed to detect potential noise on central air data computer, stickiness in standby instruments, or stability of the autopilot system. Response rates can be adjusted for specific application from 500 ft./min. to 60,000 ft./min. climb and comparable air speed rate of change.

As denoted by the dash line 9 in FIG. 3, the electronic components are enclosed within a separate thermal oven contained within the base 1 of the simulator S, and while not shown in FIG. 3, suitable heating elements and thermostatic controls will maintain prescribed temperatures within the enclosure to within 1° F.

The amplifiers 46 and 47 are of known construction and each has associated therewith a principal transmission path 76 and 77 and, in addition, there exists a feedback path 61 and 62 which allows signals to flow in the opposite direction and which are joined to the principal transmission path. In each amplifier is a device (not shown) which allows comparison of the input or command signal and the feedback signal to provide an input to the amplifier block which consists of a signal which is the difference of the input and the signal returned from the output. There is developed as aforesaid a so-called "error" signal and the error signal, in turn, is converted to the desired output signal and thus the feedback system attempts to make the measure of the output equal to the input signal.

The air speed meter or indicator 27, is of the conventional type employing the principle of the Pitot tube, and the altimeter 37, as well-known in the art, is an instrument used to determine the height of an airplane above sea level and is in effect, a sensitive aneroid barometer with the dial calibrated to read altitude above sea level.

In order to limit the Mach number (ratio of the speed of an object to the speed of sound in the undisturbed medium in which the object is traveling), there is provided in the FIG. 3 circuit between the output line 57 downstream of valve 26, a differential pressure regulator 80 to maintain the output pressure of pump P within a certain maximum pressure above demand pressure, for example, 5 p.s.i. The regulator 80, therefore, not only minimizes heating of the pump P by keeping the output to no more than needed, but additionally limits the pressure ratio of the outputs at 25 and 35 (or at connections 81 and 82 to airspeed meter 27) to Mach 2.2 in the present example. The regulator 80 is described in further detail in connection with FIG. 7.

In FIG. 3 there is also shown orifices 83 in the inputs 55 and outputs 57 and 58 of the servo valves 50 and 51 operative to limit the rates of change of pressures to acceptable values, such as 5000 feet per minute climb or descent. As safety features, the compressor outlet has therein a pressure regulator 85 which limits the maximum pressure to say, 25 p.s.i.g. and the altimeter pressure line 58 from the servo valve 51 has therein a relief valve 86 which is set for say, 1.5 p.s.i.g. or approximately −1500 feet. Thus, relief valve 86 insures that static pressure at 35 cannot exceed the minimum Pitot pressure at 25 corresponding to 80 knots by more than about 1 in. Hg.

The servo valves 50 and 51 are of identical construction and reference may be had to FIG. 4 for a detailed illustration of the same. As shown in FIG. 4, each servo valve 50 and 51 comprises a body 90 having pressure and vacuum ports 91 and 92 connected to the respective pressure and vacuum lines 55 and 56 which lead to nozzles 93 and 94 controlled by a motor armature valve 95 which is moved away from one nozzle and toward the other nozzle depending on the polarity and magnitude of the electric signal to the servo motor 96 from the respective amplifier 46 or 47. In one extreme position, with the armature valve 95 closing the vacuum nozzle 94 there will be present in the outlet port 97 a positive pressure of magnitude equivalent to that of the pump P output. Conversely, at the other extreme position, with armature valve 95 closing the pressure nozzle 93, there will be a vacuum in the outlet port 97 substantially equal to the vacuum produced by the vacuum pump V. Accordingly, depending on the position of the armature valve 95 as determined by the electric signal to the motor 96 thereof, the pressure at the output port 97 of the servo valve 50 or 51 may be anywhere between these maximum and minimum values. Reference may be had to the Moog Pat. No. 2,767,689, dated Oct. 23, 1956, for details of a motor and armature construction of the general type herein disclosed.

As shown in FIG. 5, the transducer 49 has as a reference fluid pressure, a sealed evacuated chamber 100 which is maintained at constant temperature in the enclosure 9 and depending on the magnitude of the pressure or vacuum in the chamber 101 from the line 60, the diaphragm 102 actuates the transducer unit 103 with predetermined force to provide a corresponding electric signal through the feedback loop 62.

The transducer 48 as shown in FIG. 6 is of the differential pressure type in which the pressure or vacuum in the line 60 is connected to a chamber 105 on one side of the diaphragm 106 and the pressure or vacuum in the line 59 (the output from servo valve 50) is connected to the chamber 107 on the other side of the diaphragm 106, whereby the diaphragm 106 moves to actuate the transducer unit 108 in accordance with the difference of the pressures in the chambers 105 and 107 to produce the corresponding electric feedback signal 61. The electro-mechanical transducer units 108 and 103 employed in the transducers 48 and 49 preferably are of the reluctance type but they may be of any well-known type viz, piezo-electric crrystals, E-pickoff devices (or differential transformers), potentiometers, etc. as long as they produce output signals that vary according to the mechanical displacements or forces of the inputs. As examples of pressure transducers of the above-mentioned types reference may be had to the patents to Wunsch 1,822,184, Bagby 2,871,698, Howland 2,814,198, Kinkel 2,849,669, Crandell et al. 3,045,470, and Moore 2,869,367.

The differential regulator 80 previously referred to is shown in FIG. 7 as comprising a body assembly 115 having a diaphragm 116, a spring 117 acting on the diaphragm, and a valve member 118 which is moved into or out of engagement with seat 119 according to the relative magnitudes of pump pressure in chamber 120 and demand pressure in chamber 121. When said pressures are equal or when pump pressure is less than 5 p.s.i. greater than demand pressure, the spring 117 will hold valve member 118 in open position. However, if pump pressure is more than 5 p.s.i. greater than demand pressure, then the diaphragm 116 will compress spring 117 sufficiently to cause the valve member 118 to engage seat 119.

In the present case the altimeter 37, for example, may be used for self-checking as by making a corrected barometric pressure setting on the aircraft altimeter to indicate station altitude, Because the simulator reference is to absolute pressure one predetermined value on the program selector 39 may be set to 29.921 in. Hg (standard day condition at sea level). This setting, therefore, should give a corresponding output and the zero indication on the aircraft altimeter and, likewise, on the simulator altimeter 37. This will show that the electronic control section is in calibration.

The simulator S herein may also be employed to make leakage checks in the aircraft instrument systems. For example, if the continuously variable control 38 is set to produce a static pressure for 20,000 feet altitude on the digital readout 38′, and the normally open valve 36 is closed, the control 38 may then be set to a lower altitude, for example, 5,000 feet. Accordingly, if there is any leakage beyond the closed valve 36, it will be indicated by a decrease in the readings on the altimeter 37 and on the aircraft altimeter, and the rate of leakage may be determined by the length of time that the reduction takes from the original setting to the lower setting. The same procedure may be followed for the air speed circuit. The normal allowed leakage may be, for example, 500 ft./min. for an altitude at 20,000 feet, and 2 knots per minute for air speed at 400 knots per minute.

It should be pointed out that with the continuously variable controls 28 and 38 having digital readouts 28′ and 38′, accurate values of altitude and air speed may be obtained without relying on the skill or ability of the operator, whereas, otherwise, manual adjustments to gauges requires a high degree of competence in order to obtain accurate settings.

In using the simulator S herein as an aircraft instrument checkout, the aircraft instruments such as the air speed indicator, and the altimeter, will be connected as by suitable flexible lines to the self-sealing disconnect coupling elements 25 and 35 on the control panel 2 of the simulator S. The altitude selector will then be positioned to a selected altitude by manipulating either the selector 39 to a desired accurate value as determined by the preset potentiometers 39′ and as approximately read on altimeter 37 or the continuously variable control 38 to a desired accurate value as read on the digital readout 38′ and as approximately read on altimeter 37. The selected output pressure at the quick disconnector element 35 will act on the aircraft altimeter which then should read the same altitude as the instrument altimeter 37 and the selected altitude. The altitude settings may be changed and in each case the aircraft altimeter should reflect those changes and, in addition, the altimeter selector 21 of the modulation circuit will provide in conjunction with amplitude and frequency settings by controls 19 and 20 a sinusoidal varying feedback signal which, in turn, will cause the pressure source to change and to cause corresponding change in the readings of the aircraft altimeter as well as the simulator altimeter 37.

Checkout of the air speed meter will be made in substantially the same way by manipulation either of the selector 29 or the continuously variable control 28 which results in a selected Pitot pressure at the disconnect coupling element 25 and as indicated on the simulator air speed meter 27. The pressure source is, as aforesaid, connected to the aircraft air speed meter which, if in proper operating condition, will correspond with the simulator air speed meter, and again, air speed may be sinusoidally changed in magnitude and frequency by manipulation of the modulation amplitude and frequency controls 19 and 20 when the selector 21 is set to "air speed," and as the aircraft air speed meter indicates acceleration and deceleration these indications should correspond with those occurring on the simulator air speed meter 27. It is to be noted that the pressure source for the air speed meter 27 through lines 81 and 82 includes both the static pressure which is a measure of the altitude, and the Pitot pressure, which is a measure of the air speed.

The present simulator S may also be employed as a flight computer checkout by selecting the "REMOTE" position of controls 28 and 39 and applying a varying command signal to the respective amplifiers 46 and 47. The remote supply operated by punched card, magnetic tape or the like, will vary the pressure outputs at 25 and 35 at given rates to which the computer (not shown) in the aircraft will respond by converting the varying electric command signals to pressure changes, and at the same time, the aileron setting of the aircraft will be changed according to the rate of change. If, for example, the desired altitude is reached, that is, the simulated altitude pressure fed into the computer, the signal pressure in the computer will be balanced by atmospheric pressure and the computer will return the ailerons to level flight position.

As safety features, the compressor outlet has therein a pressure regulator 85 which limits the maximum pressure to say, 25 p.s.i.g. and the altimeter pressure line 58 from the servo valve 51 has therein a relief valve 86 which is set for say, 1.5 p.s.i.g. therby to limit the maximum static pressure to about 1 in. Hg greater than the minimum Pitot pressure corresponding to the lowest setting of 80 knots.

It is to be understood that the vlaves 26 and 36 while being described as opened or closed, can be put at in-between positions for throttling or for providing variable orifices.

Other modes of applying the principle of the invention may be employed, change being made as regards the details described, provided the features stated in any of the following claims, or the equivalent of such, be employed.

I therefore particularly point out and distinctly claim as my invention:

1. A simulator for checking an air speed meter, altimeter, and like instrument comprising a fluid circuit including pump means, an electrically actuated servo valve having an inlet port in fluid communication with the output of said pump means and having an outlet port which terminates in an outlet conection for supplying fluid under pressure to such instrument; and an electric circuit including control means for preselecting different command signals to actuate said servo valve to provide different fluid pressures at said outlet conection, and electro-mechanical transducer means operatively connected with said servo valve and responsive to the fluid pressure in said outlet port for providing a feedback signal to said servo valve which conjointly with the command signal selected by said control means, is operative to maintain said servo valve at a position whereat a desired pressure is provided at said outlet connection for checking the instrument connected thereto.

2. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including a continuously variable control means having a digital readout in terms of fluid pressure for preselecting different electric signals to actuate said servo valve to provide different fluid pressures at said outlet connection, an electro-mechanical transducer operatively connected with said servo valve and responsive to the fluid pressure in said outlet port to provide a feedback signal to said servo valve which conjointly with the signal selected by said control means, is operative to maintain said servo valve at a position whereat a desired pressure as indicated by said digital readout is provided at said outlet connection for checking the instrument connected thereto.

3. A simulator for checking an air speed meter, altimeter, and like instrument comprising a fluid circuit including pump means having positive and negative pressure outputs, an electrically actuated servo valve having a pair of inlet ports in fluid communication with the respective outputs of said pump means and having an outlet port which terminates in an outlet connection for supplying fluid under pressure to such instrument; and an electric circuit including control means for preselecting different command signals to actuate said servo valve to provide different fluid pressures at said outlet connection, and electro-mechanical transducer means operatively connected with said servo valve and responsive to the fluid pressure in said outlet port for providing a feedback signal to said servo valve which conjointly with the command signal selected by said control means, is operative to maintain said servo valve at a position whereat a desired negative or positive pressure is provided at said outlet connection for checking the instrument connected thereto.

4. A simulator for checking an air speed meter, altimeter, and like instrument comprising a fluid circuit including pump means providing outputs of fluid pressure less than or greater than atmospheric pressure, electrically actuated servo valves each having inlet ports in fluid communication with the respective outputs of said pump means and each having an outlet port which terminates in an outlet connection for supplying fluid under pressure to an instrument; and an electric circuit including control means for each servo valve for selecting different command signals to actuate said servo valves to provide different negative or positive fluid pressures at said outlet connections, electro-mechanical transducer means operatively connected with the respective servo valves and responsive to the fluid pressure in the respective outlet ports for providing feedback signals to said servo valves which conjointly with the command signals selected by said control means, are operative to maintain said servo valves at positions whereat desired pressures are provided at said outlet connections for checking the instruments connected thereto.

5. A simulator for checking an air speed meter, altimeter, and like instrument comprising a fluid circuit including pump means having positive and negative pressure outputs, an electrically actuated servo valve having a pair of inlet ports in fluid communication with the respective outputs of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means, is operative to maintain said servo valve at a position whereat a desired negative or positive pressure is provided at said outlet connection for checking the instrument connected thereto, said control means comprising a continuously variable potentiometer with a digital fluid pressure readout.

6. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means is operative to maintain said servo valve at a position whereat a desired pressure is provided at said outlet connection for checking the instrument connected thereto, and time-delay means for energizing said fluid circuit after energization of said electrical circuit whereby the components of the latter are stabilized before fluid pressure is available at said outlet connection.

7. A simulator for checking an air speed meter, altimeter, and the like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means is operative to maintain said servo valve at a position whereat a desired pressure is provided at said outlet connection for checking the instrument connected thereto, said fluid circuit having a differential regulator to close the output of said pump means when the fluid pressure thereat exceeds that in said outlet port by a predetermined maximum amount.

8. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means is operative to maintain said servo valve at a position whereat a desired pressure is provided at said outlet connection for checking the instrument connected thereto, said electric circuit including a rectifier for D.C. operation of the components thereof from an A.C. power source.

9. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means is operative to maintain said servo valve at a position whereat a desired pressure is provided at said outlet connection for checking the instrument connected thereto, said electric circuit including frequency and amplitude modulation means operatively connected with said transducer to vary the apparent feedback signal and accordingly to vary the fluid pressure at said output connection.

10. A simulator for checking an air speed meter, altimeter, and the like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signal to actuate said servo means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means, is operative to maintain said servo valve at a position whereat a desired pressure is provided at said outlet connecion for checking the instrument connected thereto, said output connection comprising a self-sealing quick disconnect coupling element.

11. A simulator for checking an air speed meter, altimeter, and like instrument comprising a fluid circuit including pump means, an electrically actuated servo valve having an inlet port in fluid communication with the output pump of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means is operative to maintain said servo valve at a position whereat a desired pressure is provided at said outlet connection for checking the instrument connected thereto, said fluid circuit having a shutoff valve therein upstream of said outlet connection whereby, upon closing of said shutoff valve, leakage in the fluid circuit of the instrument may be detected by a change in the reading of the instrument.

12. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means, is operative to maintain said servo valve at a position whereat a desired pressure is provided at said outlet connection for checking the instrument connected thereto, the fluid pressure acting on said transducer being referenced to an evacuated chamber therein.

13. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means is operative to maintain said servo valve at a position whereat a desired pressure is provided at said outlet connection for checking the instrument connected thereto, said transducer being of the differential pressure type to provide a feedback signal in accordance with the difference in fluid pressures corresponding to static pressure and Pitot pressure in the case of checking of an air speed meter connected to said outlet connection.

14. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; and an electric circuit including control means for preselecting different electric signals to actuate said servo valve to provide different fluid pressures at said outlet connection, an electromechanical transducer operatively connected with said servo valve and responsive to the fluid pressure in said outlet port to provide a feedback signal to said servo valve which conjointly with the signal selected by said control means is operative to maintain said servo valve at a position whereat a desired pressure is provided at said outlet connection for checking the instrument connected thereto, said pump means having positive and negative outputs, and said servo valve having an armature valve member moved according to the magnitude of the electric signal thereto to provide a fluid pressure in said outlet port ranging between said outputs.

15. A simulator for checking an air speed meter, altimeter, and like instrument comprising a fluid circuit including pump means providing outputs of fluid pressure less than or greater than atmospheric pressure, electrically actuated servo valves each having inlet ports in fluid communication with the respective outputs of said pump means and each having an outlet port which terminates in an outlet connection for supplying fluid under pressure to an instrument; and an electric circuit including control means for each servo valve for selecting different electric signals to actuate said servo valves to provide different negative or positive fluid pressures at said outlet connections, electromechanical transducers operatively connected with the respective servo valves and responsive to the fluid pressure in the respective outlet ports to provide feedback signals to said servo valve which conjointly with the signals selected by said control means are operative to maintain aid servo valves at positions whereat desired pressures are provided at said outlet connections for checking the instruments connected thereto, one transducer having pressure thereto referenced to an evacuated chamber; and another transducer being of the differential pressure type which is in fluid communication with the output ports of two servo valves with pressures thereto referenced with respect to one another.

16. A simulator for checking an air speed meter, altimeter, and like instrument comprising a fluid circuit including pump means providing outputs of fluid pressure less than or greater than atmospheric pressure, electrically actuated servo valves each having inlet ports in fluid communication with the respective outputs of said pump means and each having an outlet port which terminates in an outlet connection for supplying fluid under pressure to an instrument; and an electric circuit including control means for each servo valve for selecting different electric signals to actuate said servo valves to provide different negative or positive fluid pressures at said outlet connections, electromechanical transducers operatively connected with the respective servo valves and responsive to the fluid pressure in the respective outlet ports to provide feedback signals to said servo valves which conjointly with the signals selected by said control means are operative to maintain said servo valves at positions whereat desired pressures are provided at said outlet connections for checking the instruments connected thereto, and an altimeter and an air speed meter operatively connected between the respective outlet ports and outlet connections.

17. A simulator for checking an air speed meter, altimeter, and like instrument comprising a fluid circuit including pump means providing outputs of fluid pressure less than or greater than atmospheric pressure, electrically actuated servo valves each having inlet ports in fluid communication with the respective outputs of said pump means and each having an outlet port which terminates in an outlet connection for supplying fluid under pressure to an instrument; and an electric circuit including control means for each servo valve for selecting different signals to actuate said servo valves to provide different negative or positive fluid pressures at said outlet connections, electromechanical transducers operatively connected with the respective servo valves and responsive to the fluid pressure in the respective outlet ports to provide feedback signals to said servo valves which conjointly with the signals selected by said control means are operative to maintain said servo valves at positions whereat desired pressures are provided at said outlet connections for checking the instruments connected thereto, and a temperature controlled enclosure about said servo valves, said electric circuit, and said transducers to render said simulator insensitive to ambient temperature changes.

18. The simulator of claim 5 wherein said control means additionally comprises a plurality of preset potentiometers, and switch means for establishing an electric circuit through any one of said preset potentiometers or through said continuously variable potentiometer.

19. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; an electric circuit including control means operatively connected to said servo valve for maintaining said servo valve at various positions to provide selected pressures at said outlet connection for checking the instrument connected thereto, and time-delay means for energizing said fluid circuit after energization of said electric circuit whereby the components of the latter are stabilized before fluid pressure is available at said outlet connection.

20. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; control means operatively connected to said servo valve for maintaining said servo valve at various positions to provide selected pressures at said outlet connection for checking the instrument connected thereto, and a differential regulator in said fluid circuit for closing the output of said pump means when the fluid pressure thereat exceeds that in said outlet port by a predetermined maximum amount.

21. A simulator for checking an air speed meter, altimeter, and like instrument comprising a fluid circuit including pump means, an electrically actuated servo valve having an inlet port in fluid communication with the output of said pump means and having an outlet port which terminates in an outlet connection for supplying fluid under pressure to such instrument; control means operatively connected to said servo valve for maintaining said servo valve at various positions to provide selected pressures at said outlet connection for checking the instrument connected thereto, and a shutoff valve in said fluid circuit upstream of said outlet connection whereby, upon closing of said shutoff valve, leakage in the fluid circuit of the instrument may be detected by a change in the reading of the instrument.

22. The simulator of claim 1 further comprising means for restricting the flow through said inlet and outlet ports to limit the rate of change of pressure at said outlet connection.

23. The simulator of claim 1 wherein said electric circuit further includes an amplifier having means for comparing the command and feedback signals from said control means and transducer means, respectively, to provide a signal equal to the difference between such command and feedback signals for actuating said servo valve as aforesaid.

References Cited

UNITED STATES PATENTS

| | | | |
|---|---|---|---|
| 3,003,253 | 10/1961 | Decker | 35—12 |
| 3,039,206 | 6/1962 | Wilson | 35—12 |
| 3,105,308 | 10/1963 | Peck | 35—12 |
| 3,150,319 | 9/1964 | Hofferber | 340—214 X |
| 3,155,765 | 11/1964 | Lansch | 340—214 |

MALCOLM A. MORRISON, *Primary Examiner.*

J. RUGGIERO, *Assistant Examiner.*